United States Patent [19]

Battey

[11] Patent Number: 5,484,319

[45] Date of Patent: Jan. 16, 1996

[54] BOX CALL APPARATUS AND METHOD

[75] Inventor: Michael L. Battey, Pineville, N.C.

[73] Assignee: Primos, Inc., Jackson, Miss.

[21] Appl. No.: 370,710

[22] Filed: Jan. 10, 1995

[51] Int. Cl.$^6$ ...................................................... A63H 5/00
[52] U.S. Cl. ................................................................ 446/397
[58] Field of Search ................................... 446/397, 418, 446/421

[56] References Cited

U.S. PATENT DOCUMENTS

| | | | |
|---|---|---|---|
| 2,511,403 | 6/1950 | Fleener | 446/397 |
| 2,958,157 | 11/1960 | Tannehill | 446/397 |
| 4,041,639 | 8/1977 | Funk | 446/397 |
| 4,343,108 | 8/1982 | Lee | 446/397 |
| 4,586,912 | 5/1986 | Adams | 446/397 |
| 4,932,920 | 6/1990 | Hearn | 446/397 |

*Primary Examiner*—Mickey Yu
*Attorney, Agent, or Firm*—L. Grant Foster; Foster & Foster

[57] ABSTRACT

A box call apparatus including a box frame and a hinged lid pivotally coupled to the box frame. The lid includes a main body section and a sound producing section for contacting the box frame. The main body section of the lid is injection molded. The sound producing section is mounted in a recessed area formed in the main body section. The sound producing section can be made of wood, etched glass, slate, or any suitable material. The relatively small sound producing section reduces the overall amount of fine tuning required in manufacturing the box call, and the overall cost and time required to produce the lid. The lid may include an arrangement for varying the weight along its length to fine tune the sounds produced by the box call.

3 Claims, 4 Drawing Sheets

BOX CALL APPARATUS AND METHOD

TECHNICAL FIELD

This invention relates to game calls for imitating natural sounds of game animals, and more particularly, to box-type game calls for imitating natural sounds of game animals.

BACKGROUND OF THE INVENTION

Various types of box-type calls have been developed over the years for calling game animals. A box call is relatively easy to use compared with other types of calls, such as mouth diaphragm calls. One type of box call includes a lid pivotally attached on top of a hollowed-out box frame. Friction from the lid striking against an edge of the box frame produces tones intended to simulate natural sounds of game animals, particularly wild turkeys.

To achieve high quality sounds, however, traditional box calls must undergo an extensive, labor-intensive manufacturing process. As most box calls are made entirely of wood, the entire call, including the box frame and the pivoting lid, must be shaped, carved, and formed to produce the precise sounds desired. After the call is roughed out, a fine tuning process must further refine the hollowed-out portion of the box frame and the lid.

Sounds intended to imitate game animals are produced when the lid is pulled across a top surface of a vertical wall of the box frame. The lid must be manufactured so that grains of the wood are properly oriented if high quality sounds are to result. The lid must also be shaped and beveled such that various tone changes will occur as the lid is scraped across the top surface of the vertical wall. The hollowed-out chamber of the box frame conduces, amplifies, and provides resonance to the sounds. Accordingly, each component of the box call must be cut, formed, molded, sanded, and otherwise modified until the desired sounds are achieved. There are always a certain number of box calls that simply do not perform as desired, even after extensive tuning. These calls are simply discarded.

One reason that box calls are difficult, and sometimes impossible, to tune is that a substantial amount of sound-producing material, such as wood, must be fine tuned. Most box calls are made entirely of wood and therefore the side tone board and lid may need to be formed and modified. The weight, density, and grain orientation of the wood are the primary factors in the tone produced by such box calls. The heavier the wood, the lower the tone. Conversely, the lighter the wood, the higher the tone. For a given size of wood, the weight can vary up to 30%. Wood grains will also vary greatly from one piece of wood to another and from one type of wood to another. Extensive hand selection and hand tuning of the wood is commonly required in constructing wooden box calls. In view of the foregoing, wooden box calls are difficult to mass produce. The difficulties with respect to mass production of box calls is directly related to the amount of wood used in building box calls, even with an exacting pattern.

With respect to the lid portion specifically, many labor-intensive manufacturing steps must be performed to produce a proper sounding lid. For example, the following steps have traditionally been required: (1) select an apparently suitable block of wood in terms of grain and density; (2) run the block of wood through a wood molder; (3) cut the molded wood to length; (4) cut out the handle portion; (5) sand and round off corners; (6) drill a hold for pivotal mounting; (7) brand the wood with a logo; and (8) apply a sealer or wood finish to all parts of the lid except where the sound is created.

In addition to the above-mentioned steps, only special types of wood, such as mahogany, are suitable for producing proper sounds. Many of the desired types of woods must be obtained from locations where heavy deforestation is occurring to the demise of the environment. Specialized types of wood are also expensive and add to the overall cost of manufacturing the box calls. Accordingly, anything that can be done to minimize the use of wood in a box call would be beneficial both with respect to manufacturing costs and the environment.

Still another problem with box calls is that the density of a single piece of wood, such as a lid, may vary greatly along its length. It may therefore be necessary to change the weight of the lid at one or more locations along its length to achieve the desired sounds upon striking the lid against the box frame. Traditional box calls have provided no adequate means for varying the weight of a box call lid along its length.

In view of the foregoing, there is a need to develop a box call, and more particularly a lid for a box call, that reduces the overall time required for manufacturing, that reduces the cost of production, that minimizes the amount of sound-producing material, such as specialized wood, required to manufacture the box call, that reduces the number of steps required to manufacture the box call, and that provides a means for varying the weight of the box call lid along its length, to control the tone and pitch of desired sound.

OBJECTS AND SUMMARY OF THE INVENTION

It is a primary object of the present invention to provide a box call that is easier to manufacture than traditional box calls.

Another object of the invention is to provide a box call that is easier to fine tune than traditional box calls.

Still another object of the invention is to reduce the amount of sound-producing material that must be shaped, formed, or cut to achieve a proper sounding box call.

Yet another object of the present invention is to provide a box call that is less expensive to manufacture and less labor intensive than prior box calls.

Another object of the present invention is to provide a box call having a lid that requires fewer manufacturing steps to manufacture than prior box call lids.

Still another object of the invention is to provide a box call lid which is at least in substantial part injection molded.

Another object of the invention is to provide a box call with an injection molded lid in which a section of sound-producing material is mounted.

Still another object of the invention is to provide a lid for a box call that reduces the overall amount of sound producing material required.

Another object of the invention is to provide a lid for a box call that includes wood as the sound-producing material and in which the amount of wood required for the lid is minimized.

Another object of the invention is to reduce the overall waste material generated in the box call manufacturing process.

Yet another object of the invention is to provide a box call lid having a means for varying the weight of the lid along its length to change the sounds produced when the lid strikes the box frame.

Another object of the invention is to provide a lid for a box call that allows the weight of the lid to be changed quickly and efficiently.

The foregoing objects are achieved by a box call apparatus including a box frame and a hinged lid pivotally coupled to the box frame. The lid includes a main body section and a sound producing section for contacting the box frame. The main body section of the lid is injection molded. The sound producing section is mounted in a recessed area formed in the main body section. The sound producing section can be made of wood, etched glass, slam, or any suitable material. The relatively small sound producing section reduces the overall amount of fine tuning required in manufacturing the box call, and the overall cost and time required to produce the lid. The lid may include a means for varying the weight along its length to fine tune the sounds produced by the box call.

Other objects, features, and advantages of the invention will become apparent from the following detailed description of the invention with reference to the drawings.

BRIEF DESCRIPTION OF THE DRAWINGS

Preferred embodiments of the invention are described below with reference to the accompanying drawings.

DETAILED DESCRIPTION OF THE PREFERRED EMBODIMENTS

Figure 1:
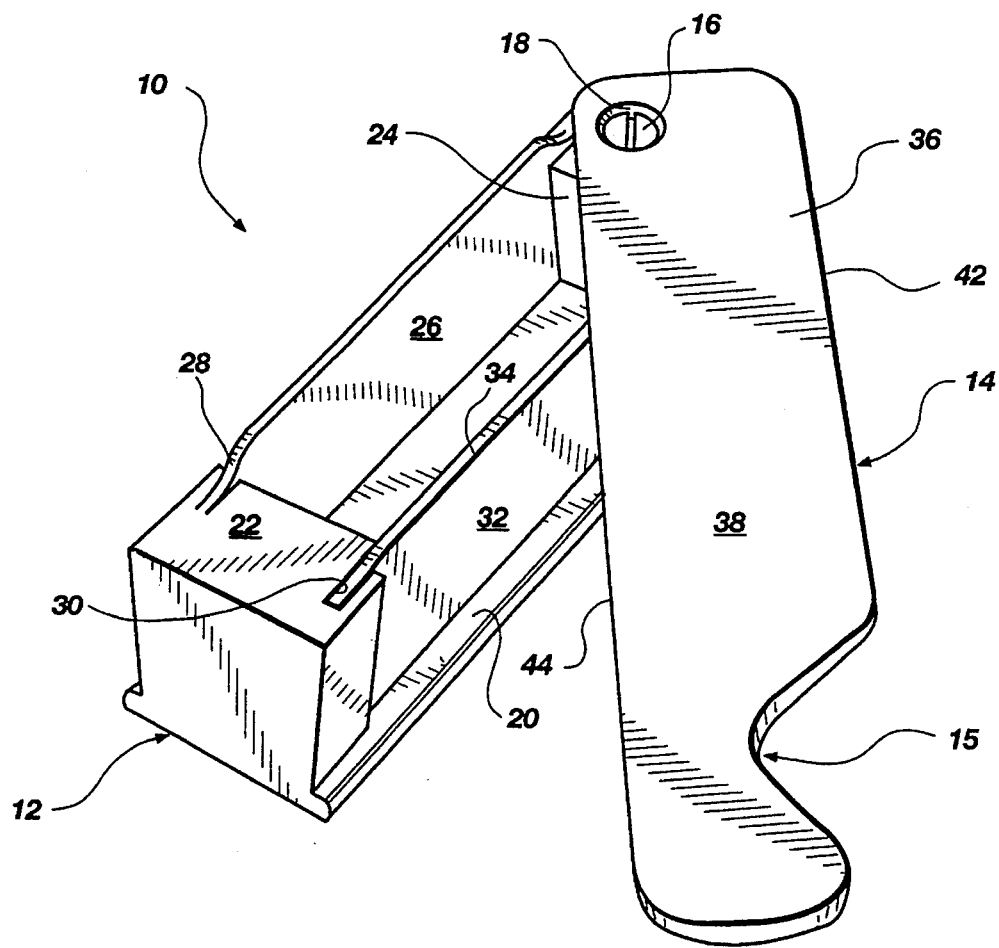
FIG. 1 is a top isometric view of a box call apparatus according to the present invention.
Figure 2:
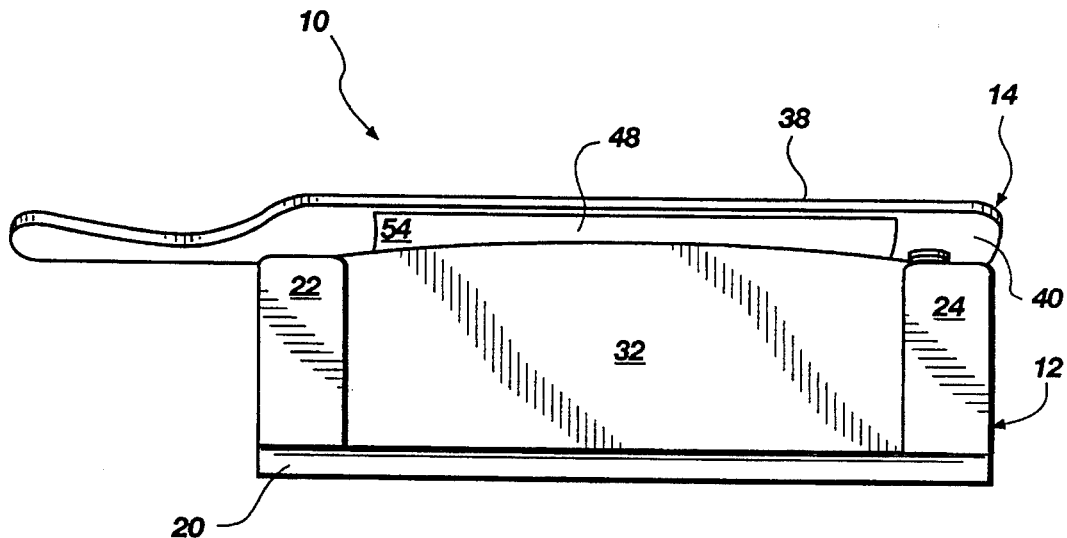
FIG. 2 is a front elevation view of the box call apparatus of FIG. 1 showing the sound producing section mounted in the main body section of the lid.

FIGS. 1–2 show a first embodiment of a box call apparatus 10 according to the present invention. The box call apparatus more specifically includes a box frame 12 and a lid 14. The lid is pivotally coupled to the box frame at a pivot point comprising a fastener 16 mounted through an aperture 18 formed in the lid portion. The aperture 18 is countersunk to receive a correspondingly tapered head of the fastener 16. The countersunk aperture allows the lid to be pivoted side-to-side as well as rotated slightly up and down to enable the user to strike the lid against a portion of the box frame to create sounds that imitate natural sounds of game animals.

In the embodiment shown in FIGS. 1–2, the box frame 12 preferably comprises an injection molded section including a base or platform 20, a pair of opposed side walls 22, 24, and a back wall 26. The injection molded section can be made of any suitable plastic composite or polymer material for effectively conducing sound vibrations to produce high quality tones.

The back wall 26 includes a raised lip 28 which acts as a stop to limit the side-to-side pivoting of the lid 14. The side walls 22, 24 define respective slots 30 (only one shown in FIG. 1) into which a vertical wall 32 is mounted. The vertical wall is preferably made of a sound producing material, such as wood, ceramic, glass, slate or other suitable material. The vertical wall 32 includes a top edge surface 34 which contacts the lid 14 to create sounds that imitate natural sounds of game animals. The lid strikes the top surface 34 and the resulting friction generates the desired sounds.

Figure 4:
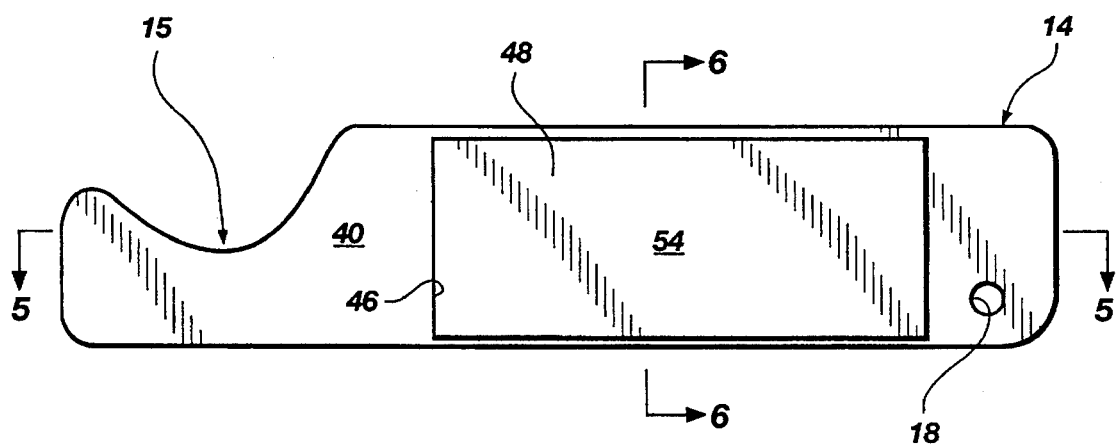
FIG. 4 is a bottom view of the lid portion of the box call apparatus of FIGS. 1 and 2.
Figure 5:
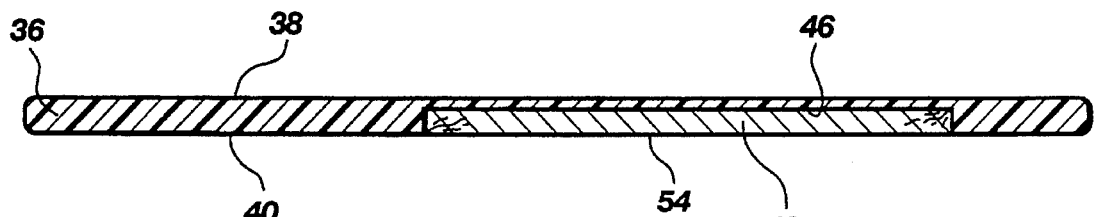
FIG. 5 is a sectional from elevation view of the box call lid, taken along the line 5—5 of FIG. 4.
Figure 6:
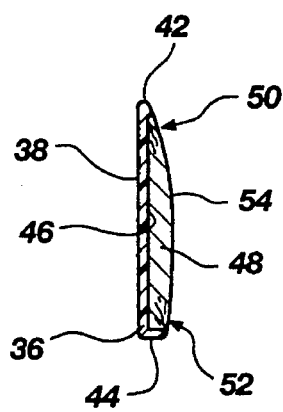
FIG. 6 is a sectional side elevation view of the box call lid, taken along the line 6—6 of FIG. 4.
Figure 7:
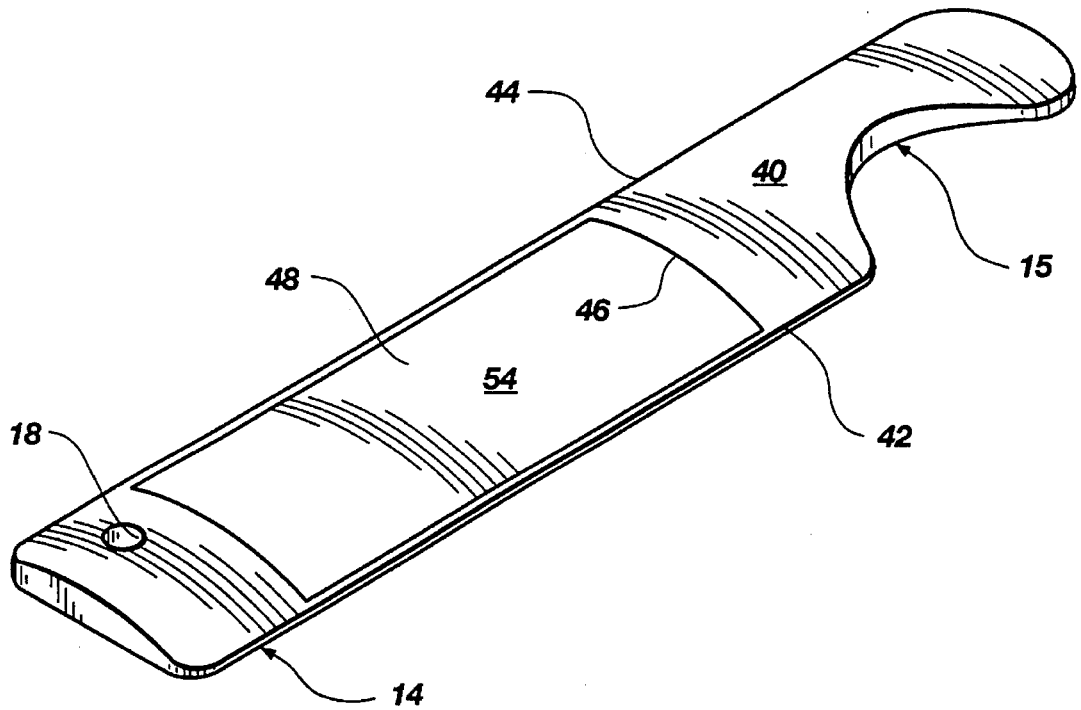
FIG. 7 is a bottom isometric view of the box call lid of FIG. 1.

FIGS. 4–6 disclose additional details of the lid portion 14 of the box call 10 of FIGS. 1–2. The lid comprises generally a main body section 36 having a top surface 38 and a bottom surface 40 (FIG. 5), and having a trailing edge 42 and a leading edge 44 (FIG. 6). The lid further includes a notched out handle portion 15 where the caller grasps the lid when using the call. As mentioned, the lid is pivotally mounted to the box frame through aperture 18. The main body section 36 of the lid is preferably injection molded and made of a suitable plastic composite or polymer for effectively conducing sound vibrations to produce high quality tones.

A recessed area 46 is formed in the bottom wall 40 of the main body section 36. The recessed area is sized to receive an inlaid sound producing section of material 48. The inlaid sound producing section 48 has a length that preferably extends to cover substantially the span of the top edge surface 34 of the vertical wall 32. The sound producing section 48 may comprise any suitable material such as wood, slate, etched glass, or the like. One advantage of the present invention is that because of the substantial reduction in overall size of the sound producing section 48 of the lid 14, the heavier sound producing materials, such as slate and glass, can be incorporated into the lid without the normal dramatic increase in weight that would otherwise occur if the entire lid were made of such a heavy material.

The sound producing section 48 more specifically comprises a generally wedged shaped piece of sound-producing material (FIG. 6). A contoured surface 54 extends from a relatively thick leading edge portion 52 to a relatively thin trailing edge portion 50. The sound producing section is mounted in the recessed area such that the contoured surface 54 and the bottom surface 40 (FIG. 5) of the main body section 36 join to form a contiguous contoured surface.

When the box call 10 is used, the caller typically uses two hands: one hand holds the box frame 12 and the other hand holds and manipulates the lid 14. The sound producing section 48 of the lid first strikes the top edge surface 34 of the box frame 12 at the relatively thick leading edge 52. While maintaining the lid in continuous contact with the top edge surface 34, the lid is dragged across the top edge surface 34 toward the relatively thin trailing edge portion 50 of the sound producing section 48. The duration and force of the contact will determine the type and tone of the call produced. The box call is capable of creating a full range of calls. With respect to wild turkeys, the types of calls may include, without limitation, yelps, purrs, cackles, and clucks.

Since the main body portion 36 of the call is injection molded, the manufacturing process is dramatically reduced. The only steps required are: (2) selecting a relatively small block of wood with a suitable grain and density; (2) running a stock piece of wood through a molder; (3) cutting the molded piece of wood to length to form the sound producing section 48; and (4) securing the sound producing section into the recessed area 46. The sound producing section can be mounted inside the recessed area using glue or any other suitable attachment means.

To fine tune the lid 14 of the box call 10, only the inlaid sound producing section 48 needs to be further modified adjust the sounds produced by the call. The sound producing section will comprise only approximately 35% of the total weight of the lid. By shaping the exposed surface 54, the desired sound can be produced relatively quickly and inexpensively. Therefore, the lid 14 is consistently and easily produced. The lid 14 minimizes the wood required for the call, greatly reduces the number lids likely to be rejected because they cannot be tuned, reduces manufacturing costs, and reduces the waste produced in manufacturing the lids.

Figure 3:
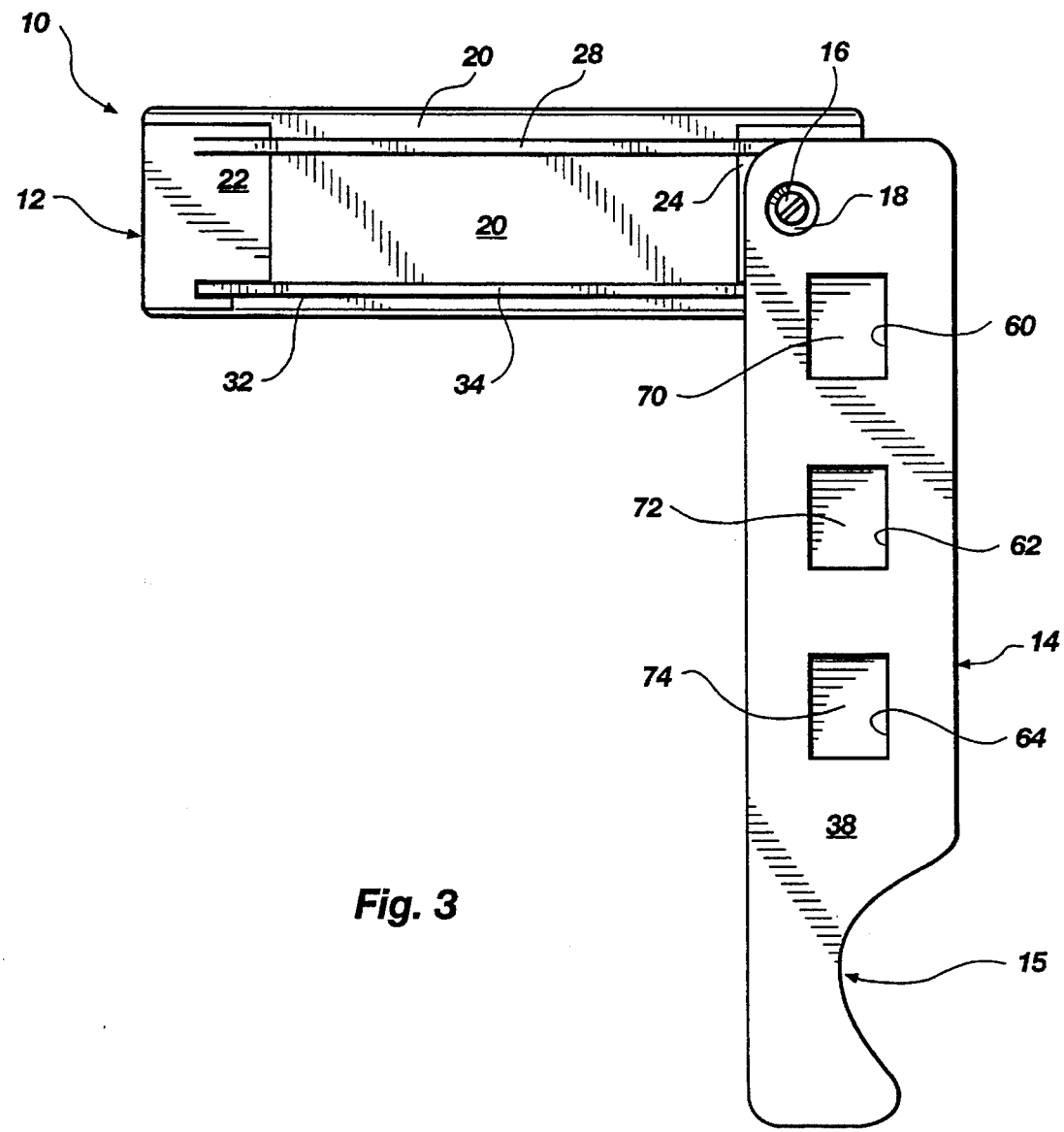
FIG. 3 is a top view of the box call apparatus of FIG. 1 showing an alternative embodiment of a lid, which includes cavities for varying the weight of the lid along its length.

FIG. 3 shows an alternative embodiment of the lid portion 14. It can be seen that a plurality of cavities 60, 62, 64 are formed in the top surface 38 of the lid. A plurality of correspondingly sized weights 70, 72, 74 may be inserted into the cavities to vary the weight of the lid 14 along its length. It should be understood that the sizes and locations of the cavities and corresponding weights may vary without departing from the scope of the present invention. This weight adjustment means further aids in fine tuning the lid to quickly and efficiently manufacture a box call capable of producing optimal sounds for calling game.

Figure 8:
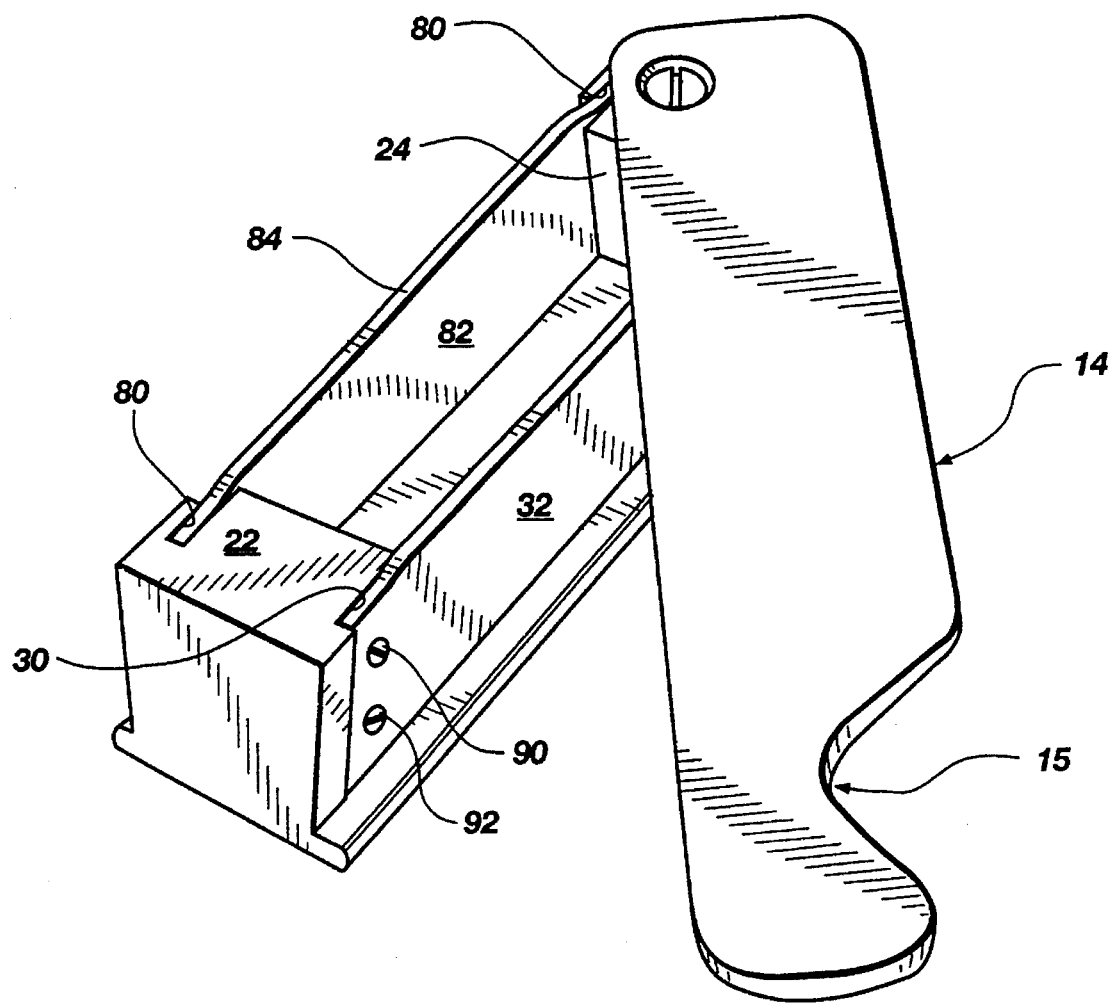
FIG. 8 is an isometric view of an alternative embodiment of a box call apparatus on which a lid according to the present invention is pivotally mounted.

FIG. 8 shows an alternative embodiment of a box frame used in connection with the present invention. This box frame embodiment includes a second vertical sound producing wall 82 mounted in a second pair of apertures 80 formed in side walls 22, 24. The second vertical wall 82 includes a top surface 84 for contacting the surface 54 of the sound producing section 48 of the lid. The first and second vertical walls 32 and 82 allow the caller to produce the alternating high and low pitch gobbler sounds of a male turkey. The details of the lid 14 are the same as shown and described in connection with FIGS. 1–7. Although the lid 14 does not show any cavities or weight materials (similar to what is shown in FIG. 3), it is to be understood that a similar weight adjustment means may be incorporated into the box call embodiment shown in FIG. 8.

An alternative mounting arrangement is shown for the first vertical wall 32 in FIG. 8. The grooves 30 (only one shown) in the side walls 22, 24 have been modified to allow the vertical wall 32 to be pushed from the side into proper position on the side walls. Conventional fasteners 90, 92 (only one pair shown) are threadedly inserted through apertures in the vertical wall 32 and threadedly received by the side walls 22, 24. It should be understood that the second vertical wall 82 may be similarly mounted.

In compliance with the statute, the invention has been described in language more or less specific as to structural and methodical features. It is to be understood, however, that the invention is not to be limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A box call apparatus for imitating natural sounds of game animals, comprising:

a base;

a box frame secured to the base;

a vertical wall mounted in the box frame, the vertical wall having a top edge surface;

a lid pivotally coupled to the box frame, the lid comprising a handle portion, a main body section, and a sound producing section, the main body section extending from the handle portion, the main body section including a top surface, a contoured bottom surface, and a recessed area formed in the bottom surface, the sound producing section being mounted to the main body section for contacting the top edge surface of the vertical wall to produce sounds to imitate natural sounds of a game animal, the sound producing section being generally wedge-shaped, the recessed area being sized to receive the generally wedge-shaped sound producing section, the main body section having a contoured surface surrounding the recessed area, the sound producing section being mounted in the recessed area such that the contoured bottom surface and the contoured surface of the sound producing section join to form a contiguous surface;

the main body section including a length and a plurality of cavities along the length for mounting weight materials to change the weight of the lid.

2. A method of manufacturing a box call apparatus, comprising the steps of:

providing a box call frame;

providing an injection molded lid having a handle portion, a top surface and a bottom surface, the lid including a recessed portion formed in the bottom surface;

molding, cutting, and sizing a sound producing section for placement within the recessed portion;

securing the sound producing section inside the recessed portion;

pivotally coupling the lid to the box frame;

providing at least one cavity in the top surface of the injection molded lid;

mounting a weight material inside the at least one cavity to change the weight of the lid.

3. A method of manufacturing a box call apparatus, comprising the steps of:

providing a box call frame;

providing an injection molded lid having a handle portion, a top surface and a bottom surface, the lid including a recessed portion formed in the bottom surface;

molding, cutting, and sizing a sound producing section for placement within the recessed portion;

securing the sound producing section inside the recessed portion;

pivotally coupling the lid to the box frame;

providing a plurality of cavities in the top surface of the injection molded lid;

mounting weight materials inside the plurality of cavities to change the weight of the lid.

\* \* \* \* \*